United States Patent
Boyle

(10) Patent No.: US 8,015,021 B2
(45) Date of Patent: Sep. 6, 2011

(54) METHOD AND SYSTEM FOR ENABLING PERSONALIZATION OF SERVICES

(75) Inventor: Currie Peter Boyle, Burnaby (CA)

(73) Assignee: International Business Machines Corporation, Armonk, NY (US)

( * ) Notice: Subject to any disclaimer, the term of this patent is extended or adjusted under 35 U.S.C. 154(b) by 1119 days.

(21) Appl. No.: 11/600,948

(22) Filed: Nov. 16, 2006

(65) Prior Publication Data

US 2007/0130252 A1 Jun. 7, 2007

(30) Foreign Application Priority Data

Dec. 6, 2005 (CA) ..................................... 2528866

(51) Int. Cl.
*G06Q 10/00* (2006.01)
*G06F 15/16* (2006.01)
(52) U.S. Cl. ......................................... 705/1.1; 709/229
(58) Field of Classification Search ................... 705/1.1, 705/35, 500; 709/229
See application file for complete search history.

(56) References Cited

U.S. PATENT DOCUMENTS

| | | | |
|---|---|---|---|
| 4,909,356 | A | 3/1990 | Rimondi et al. |
| 5,313,766 | A | 5/1994 | Rimondi et al. |
| 6,246,998 | B1 | 6/2001 | Matsumori |
| 6,522,772 | B1 | 2/2003 | Morrison et al. |
| 6,550,672 | B1 | 4/2003 | Tracy et al. |
| 6,763,999 | B2 | 7/2004 | Coventry |
| 6,842,767 | B1 | 1/2005 | Partovi et al. |
| 2002/0021845 | A1 | 2/2002 | D'Antonio |
| 2002/0079367 | A1 | 6/2002 | Montani |
| 2002/0079368 | A1 | 6/2002 | Hankins |
| 2002/0099657 | A1 | 7/2002 | Black et al. |
| 2002/0138286 | A1* | 9/2002 | Engstrom .......................... 705/1 |
| 2003/0177072 | A1 | 9/2003 | Bared |

(Continued)

FOREIGN PATENT DOCUMENTS

EP 1 115 057 A2 10/2000

OTHER PUBLICATIONS

Speedpass. [online]. 2003. 1 page. < URL: http://www.speedpass.com/home.jsp > [retrieved Apr. 14, 2011 from http://replay.waybackmachine.org/20030207115515/http://www.speedpass.com/home.jsp].

(Continued)

*Primary Examiner* — Jamisue A Plucinski
*Assistant Examiner* — Michael M Thompson
(74) *Attorney, Agent, or Firm* — Schmeiser, Olsen & Watts; John Pivnichny

(57) ABSTRACT

A method and system for enabling personalization of services for a user. A first and second computerized service system that includes a first and second server, respectively, is utilized. An information server of a computerized information system receives a different request from the first and second server for first and second personalization information of the user, respectively. The first and second personalization information enables a first and second entity that uses the first and second server to provide a service to the user in response to the user having previously requested the service from first and second entity, respectively. The information server determines that first and second criteria for the first and second entity to receive the first and second personalization information, respectively, have been satisfied, after which the information server sends the first and second personalization information to the first and second server, respectively.

15 Claims, 4 Drawing Sheets

U.S. PATENT DOCUMENTS

| | | |
|---|---|---|
| 2004/0034646 A1 | 2/2004 | Kimball et al. |
| 2004/0089709 A1 | 5/2004 | Frick et al. |
| 2005/0114212 A1 | 5/2005 | Carrez et al. |

OTHER PUBLICATIONS

A Resurgence is in Store for Retailing—Intelligent POS (Point of Sale)—The Starting Point for Smart Decisions. [online]. 2003. 2 pages. <URL: http://www.risnews.com/ris_red_april_art4.htm > [retrieved Apr. 14, 2011 from http://replay.waybackmachine.org/20030626031205/http:www.risnews.com/ris_red_april_art4.htm].

Boxtechnologies.com/Chip and Pin. [online]. 2005. 4 pages. <URL: http://www.boxtechnologies.com/chipandpin/chip-pin.htm—this URL is no longer available >. The current URL at Box Technologies would be <URL: http://www.boxtechnologies.com/CaseStudies/Vue-Entertainment >. [retrieved Apr. 15, 2011 from http://www.itrportal.com/absolutenm/templates/article-channelnews.aspx?articleid=6665&zoneid=5].

\* cited by examiner

METHOD AND SYSTEM FOR ENABLING PERSONALIZATION OF SERVICES

FIELD OF THE INVENTION

The invention is related to the provision of services via data terminals.

BACKGROUND OF THE INVENTION

Many organizations provide services to members of the public via general purpose or dedicated data terminals. Financial institutions, for example, provide services via automatic Banking Machines (ABM), dedicated information kiosks, and On-Line banking from any suitable general purpose computer. In another example, airlines provide services via check-in kiosks located in airport and from any suitable general purpose computer via the Internet.

Although some of the organizations maintain databases to store information about people to whom they provide services, this information is not efficiently utilized.

For example, if a traveler is a frequent flier with two different airlines, his name and address, citizenship, passport number, and his preferences regarding seat selection, meal selection, preferred airport and preferred class need to be provided separately to each airline in order for the airline to make use of this information. The traveler may be required to provide this information to the airline by typing it at a self-serve kiosk. This is time-consuming and may be annoying to the traveler.

In another example, a driver may have rented a car from a first car rental company and informed that company of her preferences regarding car size, standard or automatic transmission, her age and her credit card number. When the driver wants to rent a car from a second car rental company, the information previously provided to the first car rental company is not available to the second car rental company from the database of the first car rental company, and the driver needs to reiterate all her preferences and personal information to the second car rental company.

SUMMARY OF THE INVENTION

The present invention provides a method for enabling personalization of services for a user, said method comprising:

receiving, by an information server of a computerized information system via a communication infrastructure, a first request from a first server of a first computerized service system for first personalization information of the user, said first personalization information enables a first entity to use the first server to provide a first service to the user in response to the user having previously requested the first service from the first entity via the first computerized service system;

determining, by the information server, that first criteria for the first entity to receive the first personalization information has been satisfied;

sending, by the information server to the first server, the first personalization information after said determining has been performed;

receiving, by the information server via the communication infrastructure, a second request from a second server of a second computerized service system for second personalization information of the user, said second personalization information enabling a second entity to use the second server to provide a second service to the user in response to the user having previously requested the second service from the second entity via the second computerized service system;

ascertaining, by the information server, that second criteria for the second entity to receive the second personalization information has been satisfied; and sending, by the information server to the second server, the second personalization information after said ascertaining has been performed, wherein the second computerized service system, the second request, the second personalization information, the second entity, the second service, and the second criteria differ from the first computerized service system, the first request, the first personalization information, the first entity, the first service, and the first criteria, respectively.

The present invention provides a computer system comprising a computerized information system, said computerized information system comprising a repository and an information server, said information server comprising a processor and a computer readable memory unit coupled to the processor, said memory unit containing server code that when executed by the processor implement a method for enabling personalization of services for a user, said method comprising:

receiving, by an information server of the computerized information system via a communication infrastructure, a first request from a first server of a first computerized service system for first personalization information of the user, said first personalization information enables a first entity to use the first server to provide a first service to the user in response to the user having previously requested the first service from the first entity via the first computerized service system;

determining, by the information server, that first criteria for the first entity to receive the first personalization information has been satisfied;

sending, by the information server to the first server, the first personalization information after said determining has been performed;

receiving, by the information server via the communication infrastructure, a second request from a second server of a second computerized service system for second personalization information of the user, said second personalization information enabling a second entity to use the second server to provide a second service to the user in response to the user having previously requested the second service from the second entity via the second computerized service system;

ascertaining, by the information server, that second criteria for the second entity to receive the second personalization information has been satisfied; and sending, by the information server to the second server, the second personalization information after said ascertaining has been performed, wherein the second computerized service system, the second request, the second personalization information, the second entity, the second service, and the second criteria differ from the first computerized service system, the first request, the first personalization information, the first entity, the first service, and the first criteria, respectively.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

Figure 1:
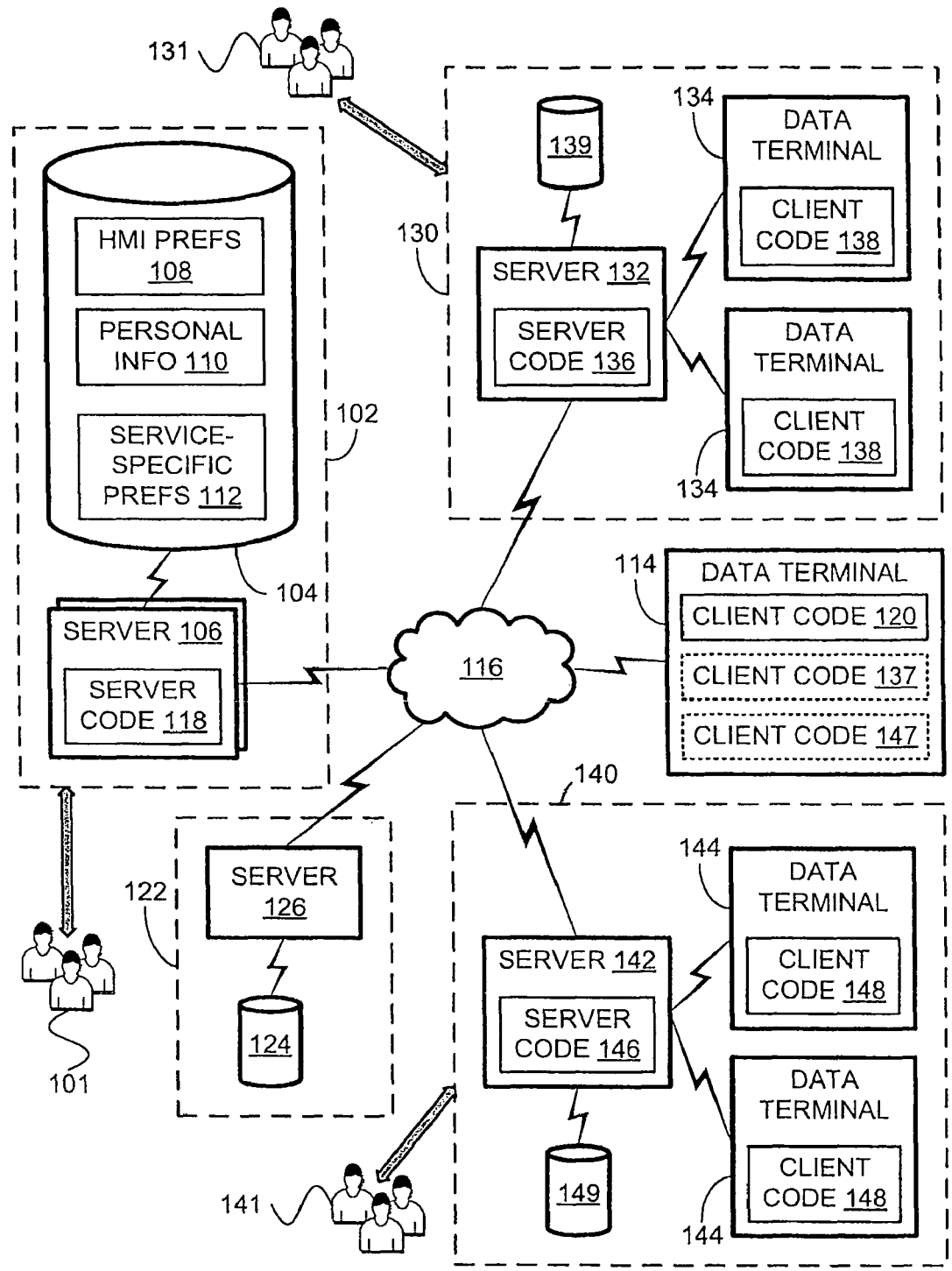
FIG. 1 is a block diagram of various computerized systems coupled by a communication infrastructure, according to embodiments of the present invention.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF THE INVENTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

A repository of information is used to provide personalized services at data terminals. A method for maintaining the repository comprises storing in the repository personalization information provided by a user and access permissions for the personalization information, the access permissions configured by the user.

A request for personalization information of the user is received from a server, the request having been generated by the server in response to the user having approached or initiated interaction with a data terminal so as to receive services from a particular entity, where the data terminal is configured to communicate with the server. In response to the request, the server is provided with requested portions of the personalization information for which the user has granted access to the particular entity.

If another request for personalization information of the user is received from another server, the other request having been generated by the other server in response to the user having approached or initiated interaction with a data terminal so as to receive services from a different entity, where the data terminal is configured to communicate with the other server, then the other server is provided with requested portions of the personalization information for which the user has granted access to the different entity.

An entity provides personalized services to users of data terminals by identifying a user as the user approaches or initiates interaction with a data terminal to receive services from the entity, requesting personalization information of the user from a repository, receiving those portions of the requested personalization information for which the user has granted access to the entity, and providing the user with personalized service via the data terminal. The service is personalized according to at least one of the received portions, and the repository is operated by a different entity than the entity that is providing the personalized service.

A computer system comprises a repository and a server coupled to the repository. The repository is to store personalization information provided by a user and access permissions for the personalization information, the access permissions configured by the user. The server is able to process requests for the personalization information from different entities from which the user is to receive personalized services via one or more data terminals.

FIG. 1 is a block diagram of various computerized systems coupled by a communication infrastructure, according to embodiments of the present invention.

An entity 101 operates a computerized information system 102 that includes a central repository 104 for storing personalization information of users and at least one server 106 to maintain repository 104. Entity 101 may be a governmental agency or a credit organization or any other trusted organization. Entity 101 may take the appropriate measures to preserve the security of the personalization information stored in repository 104 and the privacy of the users whose personalization information is stored therein.

The personalization information of a user may include, for example, human-machine interface (HMI) preferences 108, personal information 110 and service-specific preferences 112.

HMI preferences 108 may include, for example, a preferred language, preferred entry methods (e.g. usage of keyboards, pointing devices, Braille input devices, audio input devices and the like), preferred output methods (e.g. usage of monitors, Braille output devices, audio output devices and the like), preferred visual theme (e.g. colors, fonts, size of objects and the like) and the like.

Personal information 110 may include, for example, personal information (e.g. name, address, identification numbers and the like), business information (e.g. employer information, employer address, title and the like), banking information (bank account numbers, credit card numbers and the like), and the like.

Service-specific preferences 112 may include, for example, accommodation-reservation preferences (e.g. preferred hotel chains; smoking or non smoking room preferences; preferred cost range; requirements for pool, spa and gym in the hotel; preferred payment arrangements and the like), car rental preferences (e.g. preferred car types; preferred cost range, preferred payment arrangements and the like), flight-reservation preferences (e.g. regular schedules, regular routes, preferred sitting arrangements, preferred meal types, preferred airports, preferred payment arrangements and the like), automated-banking preferences (e.g. operations that the user is likely to perform on a banking machine vs. operations that are not usually used), and the like.

A user wishing to store and or edit his or her personalization information in repository 104 may access server 106 from a data terminal 114 through a communication infrastructure 116. Communication infrastructure 116 may include any combination of private and public networks, and may optionally include parts of the Internet. Data terminal 114 may be in the user's possession or may belong to someone else, for example, to a business operating an Internet café.

Figure 2:
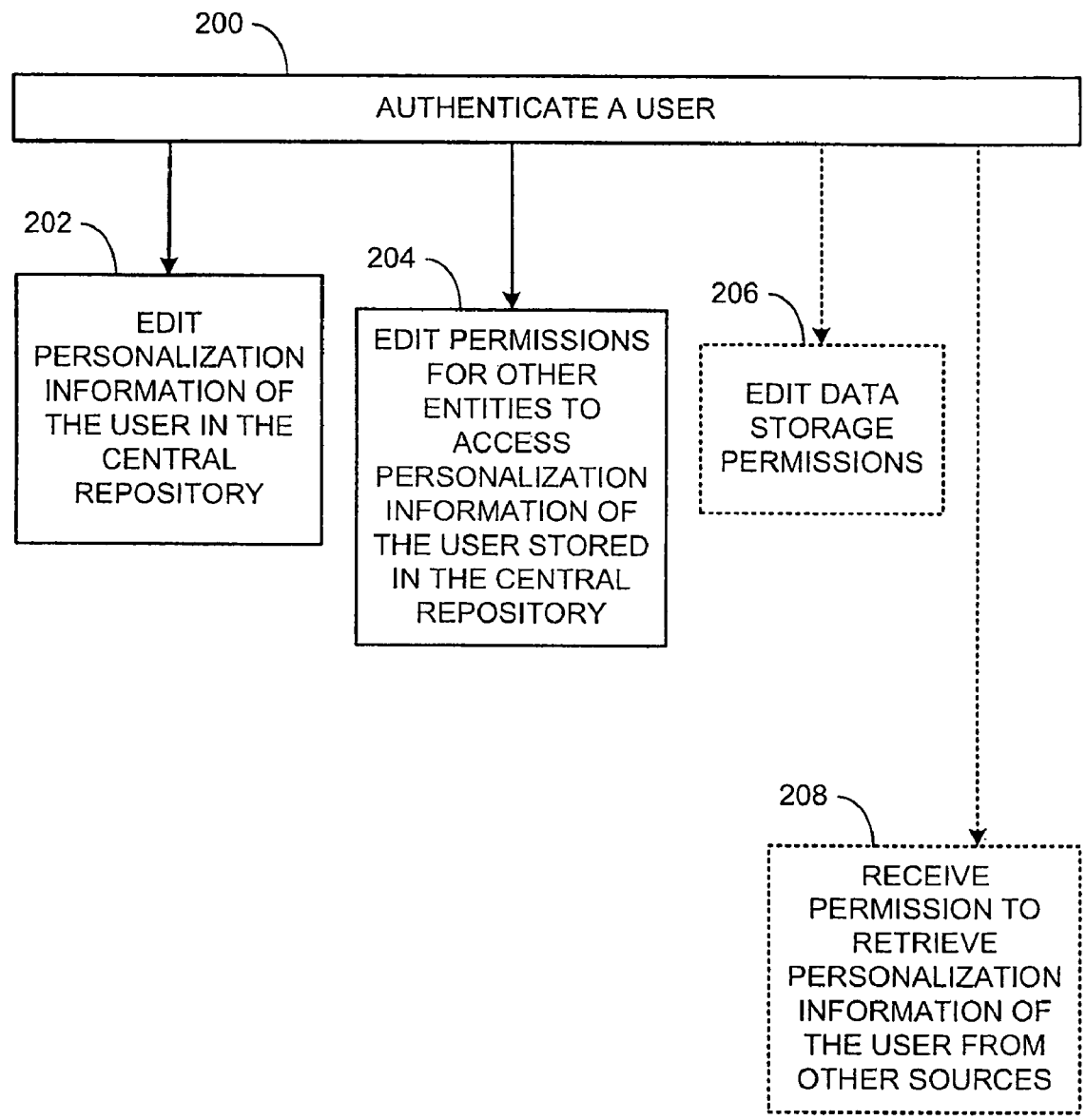
FIG. 2 is flowchart of a method for maintaining a repository of personalization information, according to embodiments of the present invention.

FIG. 2 is a flowchart of a method for maintaining repository 104, according to embodiments of the present invention. The method of FIG. 2 may be implemented by server code 118 on server 106. Client code 120 on data terminal 114, for example, a web browser, may interact with server code 118 via communication infrastructure 116.

At step 200, server 106 authenticates the identity of the user. After this authentication, the user may interact with server 106 to perform any of the activities described at steps 202, 204 and 206. At step 202, the user may add, delete or modify any part of his or her personalization information stored in repository 104.

At step 204, the user may configure access permissions for his or her personalization information stored in repository 104. The user may grant or deny access to entities to any part or the whole of the personalization information according to any relevant criteria. For example, the criteria is a function of at least one parameter selected from the group consisting of: which user preferences comprised by the personalization information the access permission refers to (e.g., human-machine interface preferences and/or service-specific preferences as discussed supra), the entity type of the entity, the name of the entity, the service type of the service provided by the entity, and combinations thereof. Generally, the criteria may include any other relevant criteria.

At step 206, the user may optionally configure data storage permissions for his or her personalization information stored in repository 104. The user may grant or deny permission to entities to store in their own databases any part or the whole of the personalization information according to any relevant criteria, including those listed above. For example, the user may configure that financial institutions have permission to store the user's credit card number, but hotels do not have permission to do so. In another example, the user may determine that rental car companies have permission to store the user's birthdate and driver's license number, but not the user's credit card number.

At step 208, server 106 may optionally be authorized by the user to interact with another computerized system 122 of another entity to retrieve personalization information of the user stored in a database 124. For example, system 122 may be operated by a credit card company or a governmental agency or any other organization. At a later time, when appropriate, server 106 may communicate with a server 126 of system 122 via communication infrastructure 116 in order to retrieve some of the personalization information of the user stored on database 124 for use by server 106.

Returning to FIG. 1, a computerized service system 130 includes a server 132 coupled to communication infrastructure 116. System 130 includes one or more dedicated data terminals 134 coupled to server 132, possibly through a network or other communication infrastructure (not shown).

Similarly, a computerized service system 140 includes a server 142 coupled to communication infrastructure 116. System 140 includes one or more dedicated data terminals 144 coupled to server 142, possibly through a network or other communication infrastructure (not shown).

Systems 130 and 140 are used by different entities 131 and 141 to provide services. A non-exhaustive list of examples for entities 141 and 141 include a person, a business organization such as a corporation and a partnership, a governmental body such as a federal, provincial, state or municipal body, an educational body such as a university or a school, a military body or any other suitable entity. System 130 (140) may also include a database 139 (149) accessible by server 132 (142) that stores information about users that have received services in the past from entity 131 (141).

The user may approach or initiate interaction with any one of data terminals 134 so as to receive services from entity 131. Server code 136 on server 132 and client code 138 on data terminals 134 enable entity 131 to provide the user with personalized service. Depending upon the implementation, client code 138 may be a thin client or a fat client.

Similarly, the user may approach or initiate interaction with any one of data terminals 144 so as to receive services from entity 141. Server code 146 on server 142 and client code 148 on data terminals 144 enable entity 141 to provide the user with personalized service. Depending upon the implementation, client code 148 may be a thin client or a fat client.

The user may also be able to receive services from entity 131 (141) via data terminal 114 if either client code 120 is able to interact with server code 136 (146) via communication infrastructure 116 or data terminal 114 stores client code 137 (147) that is able to interact with server code 136 (146) via communication infrastructure 116. Depending upon the implementation client code 137 (147) on data terminal 114 may be a thin client or a fat client.

Figure 3:
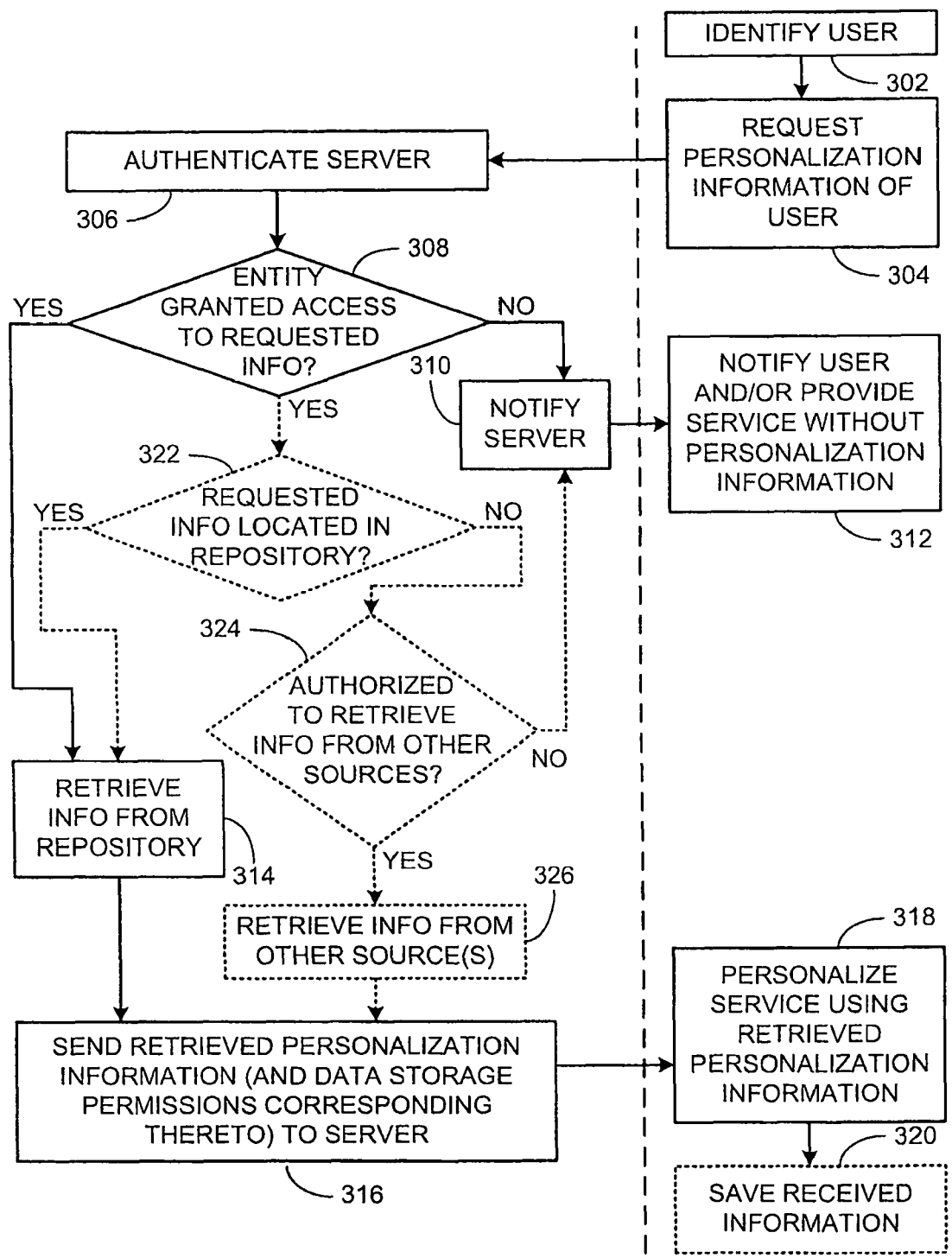
FIG. 3 is a flowchart of a method of interaction between a server that is to provide personalized service and a server coupled to a repository of personalization information, according to embodiments of the present invention.

FIG. 3 is a flowchart of a method of interaction between a server that is to provide personalized service and a server coupled to a repository of personalization information, according to embodiments of the present invention. Portions of the method to the left of the dashed line may be implemented by server code 118. Portions of the method to the right of the dashed line may be implemented by server code 136 (146).

At step 302, the user is identified by server 132 (142). For example, the user enters an authentication code or personal identification number (PIN) at the data terminal. In another example, the user interacts with biometric equipment of the data terminal. In yet another example, an authentication device of the user communicates with the data terminal wirelessly or through electro-mechanical or other contact. In a further example, both the user and the user's authentication device interact with the data terminal.

A non-exhaustive list of authentication devices includes credit cards; debit cards; smart cards; universal serial bus (USB) memory devices; semiconductor, optical and/or magnetic memory devices; a rolling-code token device, a radio frequency identification (RFID) tag, a cellular phone, a smart phone, a personal digital assistant (PDA), an electronic mail client, a gaming device, a laptop computer, a notebook computer, a wireless terminal, an MP3 (Moving Picture Experts Group Layer-3 Audio) player, a wireless handset, and the like.

At step 304, server 132 (142) requests personalization information of the user from server 106. For example, if entity 131 (141) is a rental car company, the request may be for the name, address, telephone number, drivers license number and status, age and credit card number of the user, as well as for the user's preferences for car size, automatic or standard transmission, and which types of additional insurance to buy. In another example, if entity 131 (141) is an airline, the request may be for the name, birth date, passport number and citizenship of the user, as well as for the user's preferences for which frequent flier program to use, the frequent flier membership number, whether to sit on the aisle or at the window, which class to fly, the user's preferred home airport and the like.

At step 306, server 106 authenticates server 132 (142).

At step 308, server 106 checks whether the user has granted permission to entity 131 (141) to access the requested personalization information. If entity 131 (141) has not been granted permission to access any of the requested personalization information, then server 106 notifies server 132 (142) of this at 310. At step 312, server 132 (142) may optionally notify the user and/or provide the service at the data terminal without the user's personalization information of the user. For example, server 132 (142) may prompt the user to enter the requested personalization information via the data terminal.

If entity 131 (141) has been granted access by the user to all or a portion of the requested personalization information, then at step 314, server 106 retrieves the requested information to which entity 131 (141) has been granted access, and at step 316, server 106 sends the retrieved information to server 132 (142). Optionally, if computerized system 102 supports data storage permissions, at step 316, server 106 sends to server 132 (142) the data permissions corresponding to the retrieved data.

For example, if entity 131 (141) is a rental car company, the user may have granted entity 131 (141) permission to access all of the requested personalization information except the credit card number of the user.

At step 318, server 132 (142) uses the retrieved information, along with any information about the user already stored in its own database 139 (149), to provide personalized service to the user via the data terminal. Optionally, at step 320, server entity 132 (142) stores the received information in its own database 139 (149) for future use. This act of storing at step 320 may be dependent upon the data storage permissions corresponding to the received information.

In an alternative embodiment indicated by dotted lines in FIG. 3, if entity 131 (141) has been granted access by the user to all or a portion of the requested personalization information, then at step 322, server 106 checks whether this information to which entity 131 (141) has been granted access is located in repository 104.

For those portions of the requested personalization to which entity 131 (141) has been granted permission to access, the method proceeds to step 314. However, if at least part of this information is not located in repository 104, and the user has authorized server 106 to retrieve personalization information of the user from other sources (checked at step 324), then at step 326, server 106 retrieves the personalization information that is not located in repository 104 and is located in another source, for example, database 124 of another computerized system 122. This is in addition to the personalization information retrieved at step 314 from repository 104. The method then proceeds to step 316.

For example, if entity 131 (141) is a rental car company, it is possible that the status of the user's drivers license is not stored in repository 104. The user may have previously (see FIG. 2 at 204) authorized server 106 to retrieve this information from the Transportation Ministry.

One example of how server 132 (142) provides personalized service at step 318 is to personalize a human-machine interface of the service according to at least one of the user's human-machine interface preferences 108 in the retrieved information. If the user has poor vision, perhaps larger text is shown, and/or audio clips are used to provide the service. If the user knows only English, then the service is provided to the user in English even in a country where the service is normally provided to users in a different language.

Another example of how server 132 (142) provides personalized service at step 318 is to apply at least one item of the user's personal information 110 in the retrieved information to at least one corresponding field of the service. The user's name and other personal information may be used to automatically fill in fields of a user-interface for the service that otherwise the user would have to enter in manually.

Yet another example of how server 132 (142) provides personalized service at step 318 is to personalize the service according to at least one of the user's service-specific preferences 112 of in the retrieved information. For example, the rental car may personalize the list of available cars to reflect that the user is interested only in renting full-size cars or is not willing to pay more than a certain price per day.

The personalization of the service provided may be dependent upon the context of the provision of the service. For example, different components of the user's personalization information may be applicable depending upon the time, location, date, season and weather of the provision of the service.

For example, when in Denver, the user may prefer to rent sport utility vehicles (SUVs) in the winter and convertibles in the summer. When in Los Angeles, the user may prefer to rent convertibles except when it is raining.

In another example, an elevator in an office building may whisk the user to the $44^{th}$ floor in the morning and to parking level 3 in the afternoon without the user having to specify this upon entering the elevator.

In yet another example, a coffee shop may use its computerized system to remember that the user buys drip coffee before 8 a.m., lattes after 10 a.m. and iced cappuccino after 1 p.m., that the user prefers to pay cash, and that the user's preferred order is a double cup with low fat milk.

In a further example, ATM service in the user's home town will include an option to view the user's bank account balance, but this option will not be provided elsewhere.

In yet a further example, the user will be able to request cash back when using a debit card inside the user's home country but not when the debit card is used elsewhere.

Although the preceding description of embodiments of the invention concentrates on the provision of services by entities via data terminals, the service may involve products. For example, if the data terminal is a smart vending machine and the service is vending the products, the service may be personalized according to the user's preferences by offering only "low sodium" or vegetarian products. In another example, the data terminal may assist a user in determining which mobile telephone to purchase, and perhaps only those mobile telephones which will work in the user's home country as well as in the country where the purchase is being made are offered to the user.

Although the preceding description of embodiments of the invention concentrates on the provision of services to an individual, the individual may be representing an organization and the preferences stored in the repository may be the preferences of the organization and not of the individual. For example, the treasurer of a company may conduct transactions on behalf of the company at a bank data terminal, where the banking services are "personalized" according to the preferences of the company.

Figure 4:
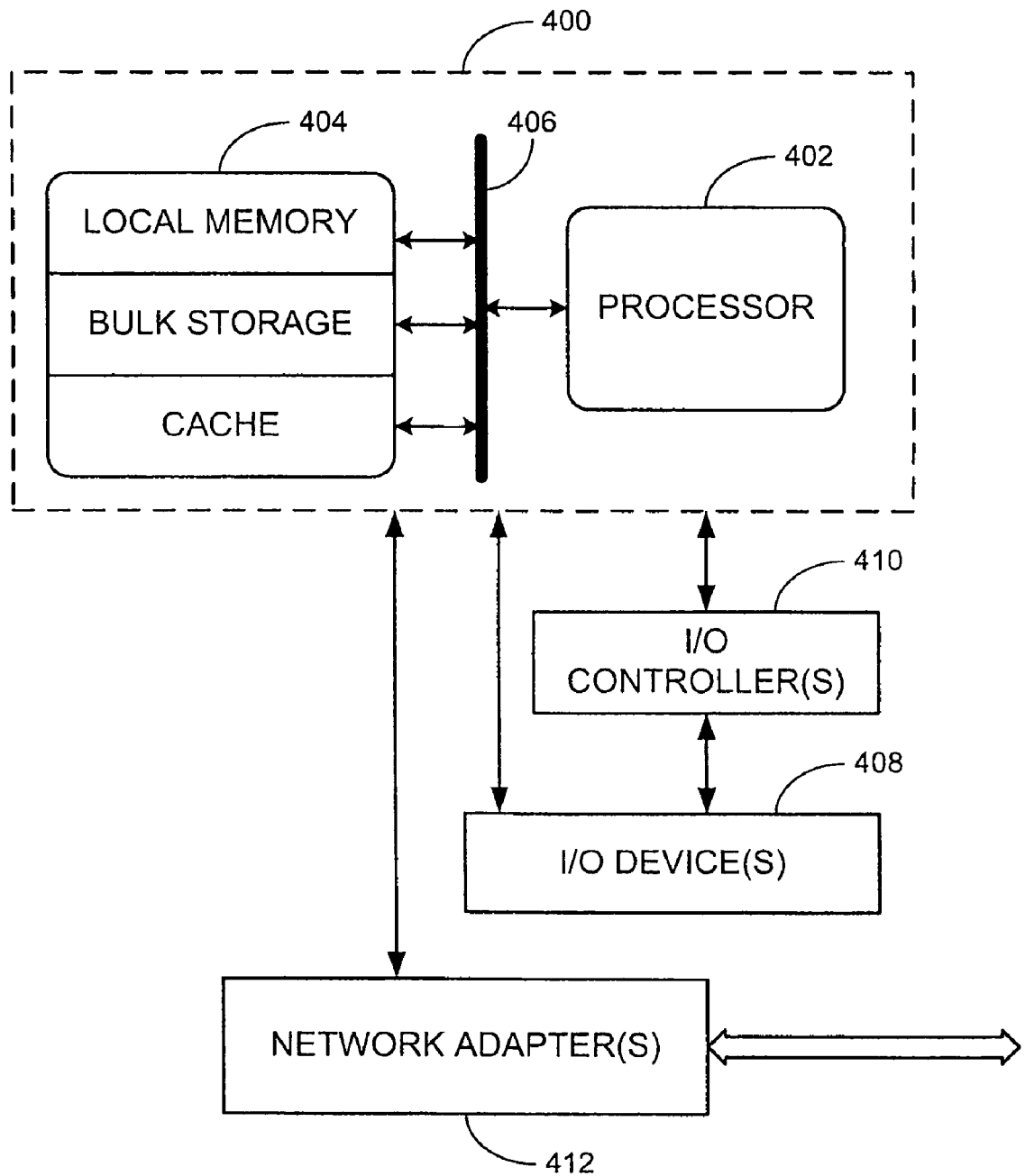
FIG. 4 is a block diagram of an exemplary computing apparatus a first personal preference of the user, according to embodiments of the present invention.

FIG. 4 is a block diagram of an exemplary computing apparatus, according to embodiments of the present invention. Data terminals 114, 134, 144 and servers 106, 126, 132 and 142 are all examples of computing apparatus.

A data processing system 400 suitable for storing and/or executing program code will include at least one processor 402 coupled directly or indirectly to memory elements 404 through a system bus 406. The memory elements 404 can include local memory employed during actual execution of the program code by the at least one processor 402, bulk storage, and cache memories which provide temporary storage of at least some program code in order to reduce the number of times code must be retrieved from bulk storage during execution. Server code 118, 136 and 146 may be stored in the memory elements of servers 106, 132 and 142, respectively. The memory elements 404 in FIG. 4 represent memory elements of any server of servers 106, 132 and 142 in FIG. 1. The at least one processor 402 of FIG. 4 represents at least one processor of any server of the servers 106, 132 and 142 in FIG. 1. A computer program product pertaining to servers 106, 132 and 142 is the bulk storage that comprises server code 118, 136 and 142 and is comprised by memory elements of servers 106, 132 and 142, respectively. The bulk storage comprised by memory elements of servers 106, 132 and 142 is a physically tangible computer readable storage medium (or media) comprising the server code 118, 136 and 142 which is configured to be executed by the at least one processor 402 of the servers 106, 132 and 142, respectively, to implement the methods of the present invention. Client code 120, 137 and 147 may be stored in the memory elements of data terminal 114. Client code 138 and 148 may be stored in the memory elements of data terminals 134 and 144, respectively.

Input/output (I/O) devices 408—including but not limited to keyboards, displays, pointing devices, and the like—can be coupled to data processing system 400 either directly or through intervening I/O controllers 410.

Network adapters 412 may also be coupled to data processing system 400 to enable data processing system 400 to become coupled to other data processing systems or remote printers or storage devices through intervening private or public networks. Modems, cable modem and Ethernet cards are just a few of the currently available types of network adapters.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for enabling personalization of services for a user, said method comprising:
   receiving, by an information server of a computerized information system via a communication infrastructure, a first request from a first server of a first computerized service system for first personalization information of the user, said first personalization information pertaining to the user comprising a name of the user, an address of the user, an address of an employer of the user, a bank account number of the user, and a credit account number of the user, said first personalization information enabling a first entity to use the first server to provide a first service to the user in response to the user at a first terminal having previously requested the first service from the first entity via a first communication path from the first terminal to the first server, said first communication path being totally external to the communication infrastructure, said communication infrastructure comprising the Internet;
   determining, by the information server, that the user has granted permission to the first entity to receive the first personalization information;
   sending, by the information server to the first server via the communication infrastructure after said determining has been performed, the first personalization information;
   prior to said receiving the first request, said information server receiving data from the user at a second data terminal via a second communication path from the second terminal to the information server;
   said information server storing the received data in a database coupled to the information server, wherein the second terminal is distinct from the first terminal, wherein the second communication path traverses the communication infrastructure, wherein the received data comprises the first personalization information of the user, the permission granted by the user to the first entity to receive the first personalization information, and a grant of permission to the first entity to have the first server store a portion of the first personalization information in a database coupled to the first server;
   sending along with the first personalization information, by the information server to the first server via the communication infrastructure after said determining has been performed, the grant of permission to the first entity to store the portion of the first personalization information in the database coupled to the first server;
   said first server receiving, from the information server via the communication infrastructure, the first personalization information of the user and the grant of permission to the first entity to have the first server store the portion of the first personalization information in the database coupled to the first server;
   said first server using, to provide personalized service to the user: said name of the user, said address of the user, said address of said employer of the user, said bank account number of the user, and said credit account number of the user;
   said first server storing the portion of the first personalization information in the database coupled to the first server via a third communication path from the first server to the database coupled to the first server, said third communication path being totally external to the communication infrastructure.

2. The method of claim 1, wherein the method further comprises obtaining, by the information server from a repository comprised by the computerized information system, the first personalization information.

3. The method of claim 1, wherein the method further comprises:
   obtaining, by the information server from a repository comprised by the computerized information system, a first portion of the first personalization information; and
   obtaining, by the information server from another computerized information system, a second portion of the first personalization information, wherein the second portion differs from the first portion, and wherein the repository does not comprise the second portion.

4. The method of claim 1, wherein the first personalization information further comprises first human-machine interface (HMI) preferences of the user, first service-specific preferences of the user that are specific to the first service, or a combination thereof.

5. The method of claim 1, said personalized service being provided to the user by the first server in dependence on the time, location, season, and weather associated with provision of the service.

6. A computer program product comprising a physically tangible computer readable storage medium having a computer readable server code stored therein, wherein said server code when executed by a processor of an information server of a computerized information system implements a method for enabling personalization of services for a user, said method comprising:
   receiving, by the information server of the computerized information system via a communication infrastructure, a first request from a first server of a first computerized service system for first personalization information of the user, said first personalization information enabling a first entity to use the first server to provide a first service to the user in response to the user at a first terminal having previously requested the first service from the first entity via a first communication path from the first terminal to the first server, said first communication path being totally external to the communication infrastructure, said communication infrastructure comprising the Internet;
   determining, by the information server, that the user has granted permission to the first entity to receive the first personalization information; and sending, by the information server to the first server via the communication infrastructure after said determining has been performed, the first personalization information;

prior to said receiving the first request, said information server receiving data from the user at a second data terminal via a second communication path from the second terminal to the information server;

said information server storing the received data in a database coupled to the information server, wherein the second terminal is distinct from the first terminal, wherein the second communication path traverses the communication infrastructure, wherein the received data comprises the first personalization information of the user, the permission granted by the user to the first entity to receive the first personalization information, and a grant of permission to the first entity to have the first server store a portion of the first personalization information in a database coupled to the first server;

sending along with the first personalization information, by the information server to the first server via the communication infrastructure after said determining has been performed, the grant of permission to the first entity to store the portion of the first personalization information in the database coupled to the first server;

said first server receiving, from the information server via the communication infrastructure, the first personalization information of the user and the grant of permission to the first entity to have the first server store the portion of the first personalization information in the database coupled to the first server;

said first server using, to provide personalized service to the user: said name of the user, said address of the user, said address of said employer of the user, said bank account number of the user, and said credit account number of the user;

said first server storing the portion of the first personalization information in the database coupled to the first server via a third communication path from the first server to the database coupled to the first server, said third communication path being totally external to the communication infrastructure.

7. The computer program product of claim 6, wherein the method further comprises obtaining, by the information server from a repository comprised by the computerized information system, the first personalization information.

8. The computer program product of claim 6, wherein the method further comprises:
obtaining, by the information server from a repository comprised by the computerized information system, a first portion of the first personalization information; and
obtaining, by the information server from another computerized information system, a second portion of the first personalization information, wherein the second portion differs from the first portion, and wherein the repository does not comprise the second portion.

9. The computer program product of claim 6, wherein the first personalization information further comprises first human-machine interface (HMI) preferences of the user, first service-specific preferences of the user that are specific to the first service, or a combination thereof.

10. The computer program product of claim 6, said personalized service being provided to the user by the first server in dependence on the time, location, season, and weather associated with provision of the service.

11. A computer system comprising a computerized information system, said computerized information system comprising a repository and an information server, said information server comprising a processor and a computer readable memory unit coupled to the processor, said memory unit containing server code that when executed by the processor implement a method for enabling personalization of services for a user, said method comprising:

receiving, by the information server of the computerized information system via a communication infrastructure, a first request from a first server of a first computerized service system for first personalization information of the user, said first personalization information enabling a first entity to use the first server to provide a first service to the user in response to the user at a first terminal having previously requested the first service from the first entity via a first communication path from the first terminal to the first server, said first communication path being totally external to the communication infrastructure, said communication infrastructure comprising the Internet;

determining, by the information server, that the user has granted permission to the first entity to receive the first personalization information; and sending, by the information server to the first server via the communication infrastructure after said determining has been performed, the first personalization information;

prior to said receiving the first request, said information server receiving data from the user at a second data terminal via a second communication path from the second terminal to the information server;

said information server storing the received data in a database coupled to the information server, wherein the second terminal is distinct from the first terminal, wherein the second communication path traverses the communication infrastructure, wherein the received data comprises the first personalization information of the user, the permission granted by the user to the first entity to receive the first personalization information, and a grant of permission to the first entity to have the first server store a portion of the first personalization information in a database coupled to the first server;

sending along with the first personalization information, by the information server to the first server via the communication infrastructure after said determining has been performed, the grant of permission to the first entity to store the portion of the first personalization information in the database coupled to the first server;

said first server receiving, from the information server via the communication infrastructure, the first personalization information of the user and the grant of permission to the first entity to have the first server store the portion of the first personalization information in the database coupled to the first server;

said first server using, to provide personalized service to the user: said name of the user, said address of the user, said address of said employer of the user, said bank account number of the user, and said credit account number of the user;

said first server storing the portion of the first personalization information in the database coupled to the first server via a third communication path from the first server to the database coupled to the first server, said third communication path being totally external to the communication infrastructure.

12. The computer system of claim 11, wherein the method further comprises obtaining, by the information server from a repository comprised by the computerized information system, the first personalization information.

13. The computer system of claim 11, wherein the method further comprises:

obtaining, by the information server from a repository comprised by the computerized information system, a first portion of the first personalization information; and obtaining, by the information server from another computerized information system, a second portion of the first personalization information, wherein the second portion differs from the first portion, and wherein the repository does not comprise the second portion.

14. The computer system of claim 11, wherein the first personalization information further comprises first human-machine interface (HMI) preferences of the user, first service-specific preferences of the user that are specific to the first service, or a combination thereof.

15. The computer system of claim 11, said personalized service being provided to the user by the first server in dependence on the time, location, season, and weather associated with provision of the service.

* * * * *